US006557380B1

(12) United States Patent
DiFrank et al.

(10) Patent No.: US 6,557,380 B1
(45) Date of Patent: May 6, 2003

(54) APPARATUS FOR FORMING GLASS CONTAINERS

(75) Inventors: Frank J. DiFrank, Toledo, OH (US); D. Wayne Leidy, Perrysburg, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 317 days.

(21) Appl. No.: 09/713,429

(22) Filed: Nov. 15, 2000

(51) Int. Cl.$^7$ ................................................ C03B 9/353
(52) U.S. Cl. .......................................... 65/359; 65/360
(58) Field of Search .......................... 65/357, 359, 360, 65/361

(56) References Cited

U.S. PATENT DOCUMENTS

| | | | | |
|---|---|---|---|---|
| 2,834,155 A | * | 5/1958 | Allen | 65/360 |
| 3,325,269 A | * | 6/1967 | Hillman | 65/360 |
| 3,357,811 A | * | 12/1967 | Youkers et al. | 65/323 |
| 3,472,639 A | | 10/1969 | Mumford | |
| 3,573,027 A | | 3/1971 | Nuzum | |
| 3,721,545 A | * | 3/1973 | Irwin | 65/261 |
| 4,427,431 A | | 1/1984 | Mumford | |
| 4,486,215 A | | 12/1984 | Irwin | |
| 4,596,591 A | * | 6/1986 | Nebelung et al. | 65/217 |
| 4,655,813 A | | 4/1987 | Nebelung | |
| 4,659,358 A | | 4/1987 | Nebelung et al. | |
| 5,578,105 A | | 11/1996 | Meyer | |
| 5,803,945 A | | 9/1998 | Grant | |
| 5,824,131 A | | 10/1998 | Grant | |

FOREIGN PATENT DOCUMENTS

EP   0 923 192 A1   6/1999

* cited by examiner

Primary Examiner—Sean Vincent (57) ABSTRACT

A glass container forming machine section (10) in which the mold carrying arms (12, 14) that are pivoted on shafts (20, 22), respectively, about a common axis (A) are caused to counteroscillate between open positions in which the mold halves (16, 18) that are respectively carried by the arms (12, 14) are separated, and closed positions in which the mold halves are joined to define molding cavities therebetween. The opening and closing motions of the mold carrying arms are powered by a single reversible electrical servo motor (24), which drives a drive gear (26). The drive gear (26) directly drives a first driven gear (28) and an intermediate driven gear (30) which, in turn, directly drives a second driven gear (34). Turning motion of the driven gears (28, 34) is imparted to stub shafts (38, 40), respectively, which carry coaxial drive gears (42, 44), respectively. The drive gears (42, 44) drive sector gears (46, 48), respectively, that are disengagably secured to the shafts (22, 20), respectively. The servo motor (24) has dual windings; a first, higher speed/lower torque winding for operating the motion of the mold carrying arms during a first portion of their closing movements and during their opening movements, and a second, lower speed/higher torque winding for operating the motion of the mold carrying arms during a second portion of their closing movements.

10 Claims, 7 Drawing Sheets

APPARATUS FOR FORMING GLASS CONTAINERS

BACKGROUND OF THE INVENTION

1. Field of the Invention

This invention relates to the manufacture of glass containers on a glass container forming machine of the I.S. ("individual section") type. More particularly, this invention relates to an improvement in the method and apparatus for opening and closing mold carrying arms of such a glass container forming machine.

2. Description of the Related Art

The manufacture of glass containers on a glass container forming machine of the I.S. type is generally described in U.S. Pat. No. 4,427,431 (Mumford et al.), which was assigned to a predecessor of the assignee of the present invention, the disclosure of which is incorporated by reference herein. As is known in the art, an I.S. machine has a multiplicity of side-by-side sections, usually 8, 10 or 12 sections, and glass containers are formed at each machine section in a two-step molding operation. In the first of these steps, a preform of the container, which is often called a parison or a blank, is formed in a first mold at a blank molding station of the I.S. machine section, either by pressing or blowing, and the blank is then transferred by a 180° inverting operation in a vertical plane to a second mold of the I.S. machine section, often called a blow mold, for forming into the finished container by blowing. In modern I.S. machines, typically a multiplicity of containers, such as two or three or even four, are simultaneously formed at each section of the I.S. machine, each in the above-described two-step process.

The molds at each section of an I.S. machine, both at the blank molding side and the blow molding side, are split molds each of which is made up of a pair of mold halves. Each mold half has an inner molding surface, and the mold halves in each mold are periodically oscillated into and out of molding contact with each other, the halves of each mold being joined end to end when the mold halves are in contact with each other to form a mold cavity in which the parison or container is formed, as the case may be. One-half of the mold halves at each machine section are carried by a first mold carrying arm, and another one-half of the mold halves at that machine section are carried by a second mold carrying arm, the first and second mold carrying arms being counteroscillated with respect to one another to periodically close and open the molds at that machine section.

As is known, for example, from U.S. Pat. No. 5,803,945 (Grant) and U.S. Pat. No. 5,824,131 (Grant et al.), it is desirable to utilize different speeds during the closing of the mold carrying arms of an I.S. machine, an initial higher speed/lower torque motion during the initial portion of a closing motion, to minimize the time consumed in effecting the closing, and a lower speed/higher torque motion during the final portion of the closing motion, to maximize the clamping forces on the mold halves when closed. However, each of the aforesaid '945 and '131 patents requires a pair of drive motors for opening and closing the opposed mold carrying arms at each I.S. machine section, one drive motor for each arm, and the need to provide a pair of drive motors to operate according to the teachings of such references requires substantial space for packaging such motors at an I.S. machine section. Further, the multiple speed operation of each of the drive motors of each of the '945 and '131 patents requires complex electronic circuitry (FIG. 16 of each reference), and this is a complexity that appears to introduce reliability problems into the operation of an I.S. machine based on the teachings of these references.

BRIEF SUMMARY OF THE INVENTION

The aforesaid and other problems associated with opening and closing the mold carrying arms of a section of an I.S. machine are overcome by the present invention in which only a single reversible servo motor is employed to power the counteroscillating motion of each of the opposed mold carrying arms at a given I.S. machine section. The servo motor employed in the practice of the present invention operates through a pair of gear drives to provide simultaneous counteroscillating motion to the mold carrying arms, and the available space taken up by the motor and the pair of gear drives is substantially less than that taken up in an installation using a pair of reversible motors, whether of the servo motor type or not. The servo motor utilized in the present invention is provided with dual windings, a first winding for imparting a higher r.p.m./lower torque motion to each of the mold carrying arms for an initial portion of a mold closing motion, and a second winding for imparting a lower r.p.m./higher torque motion during a final portion of the mold closing motion, when higher clamping forces on the mold halves are desired.

Accordingly, it is an object of the present invention to provide an improved apparatus for forming glass containers on a glass container forming machine of the I.S. type. More particularly, it is an object of the present invention to provide an improved apparatus of the aforesaid character for opening and closing mold halves at each I.S. machine section. Even more particularly, it is an object of the present invention to provide a apparatus of the aforesaid character for providing higher speed/lower torque motion to the opposed mold carrying arms at each I.S. machine section during an initial portion of the mold closing cycle, while also providing lower speed/higher torque motion to the mold carrying arms during a final portion of the motion of the mold carrying arms.

For a further understanding of the present invention and the objects thereof, attention is directed to the drawing and the following brief description thereof, to the detailed description of the preferred embodiment and to the appended claims.

DETAILED DESCRIPTION OF THE INVENTION

Figure 1:
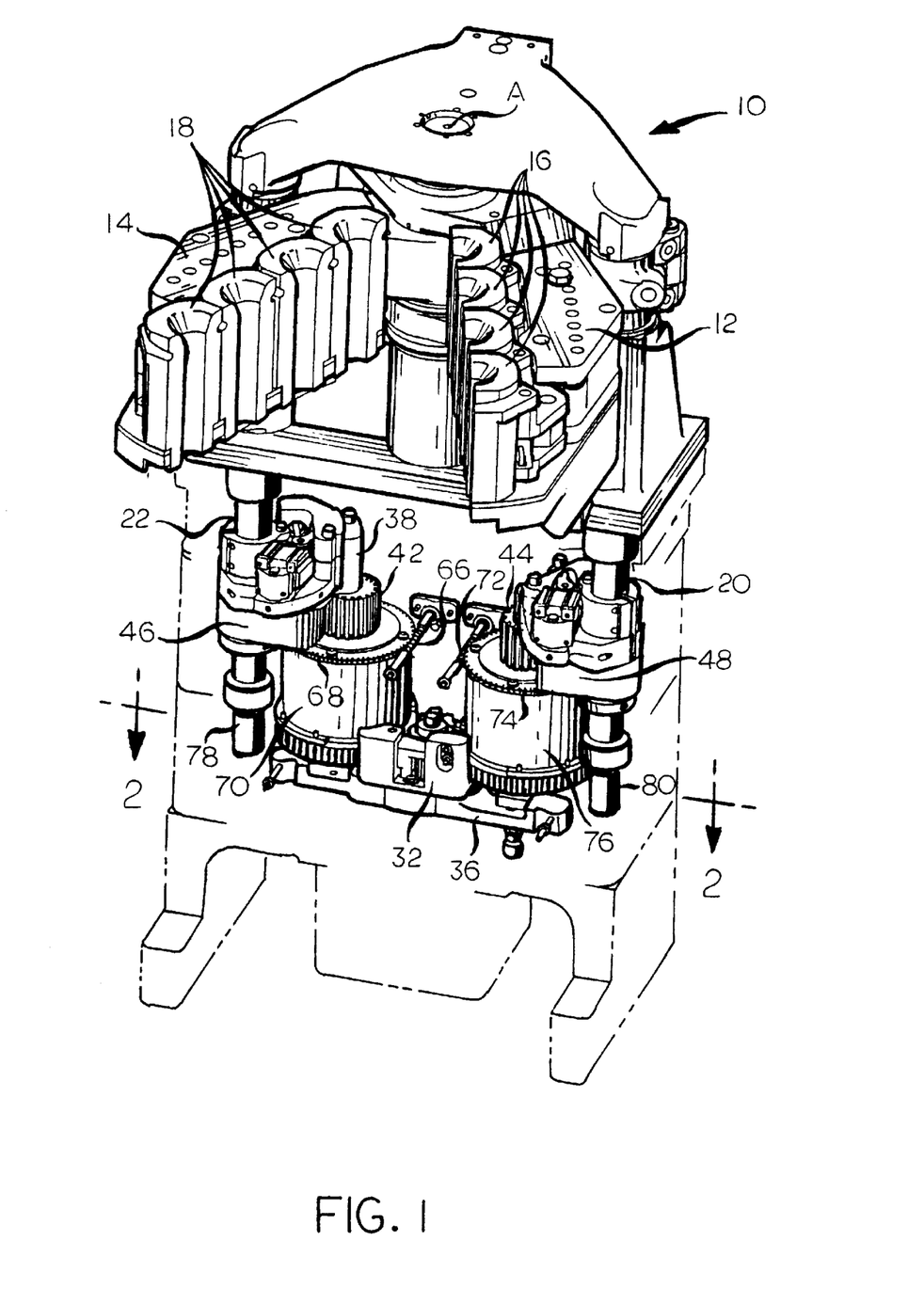
FIG. 1 is a perspective view of a mold carrying apparatus according to the preferred embodiment of the present invention for a section of a glass container forming machine of the I.S. type, shown at a blank molding side of the machine, other elements of the I.S. machine being shown in broken line.
Figure 2:
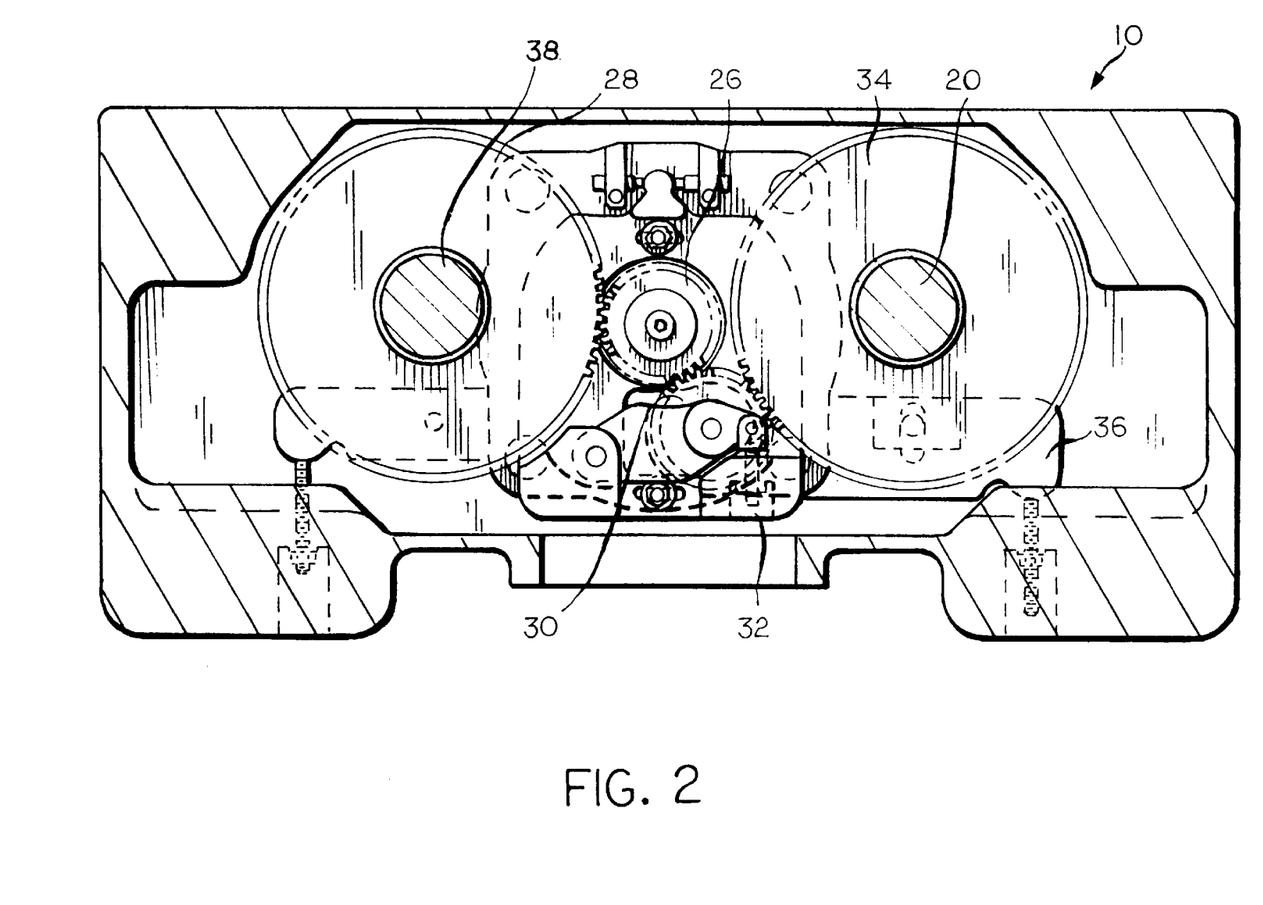
FIG. 2 is a sectional view taken on line 2—2 of FIG. 1.
Figure 3:
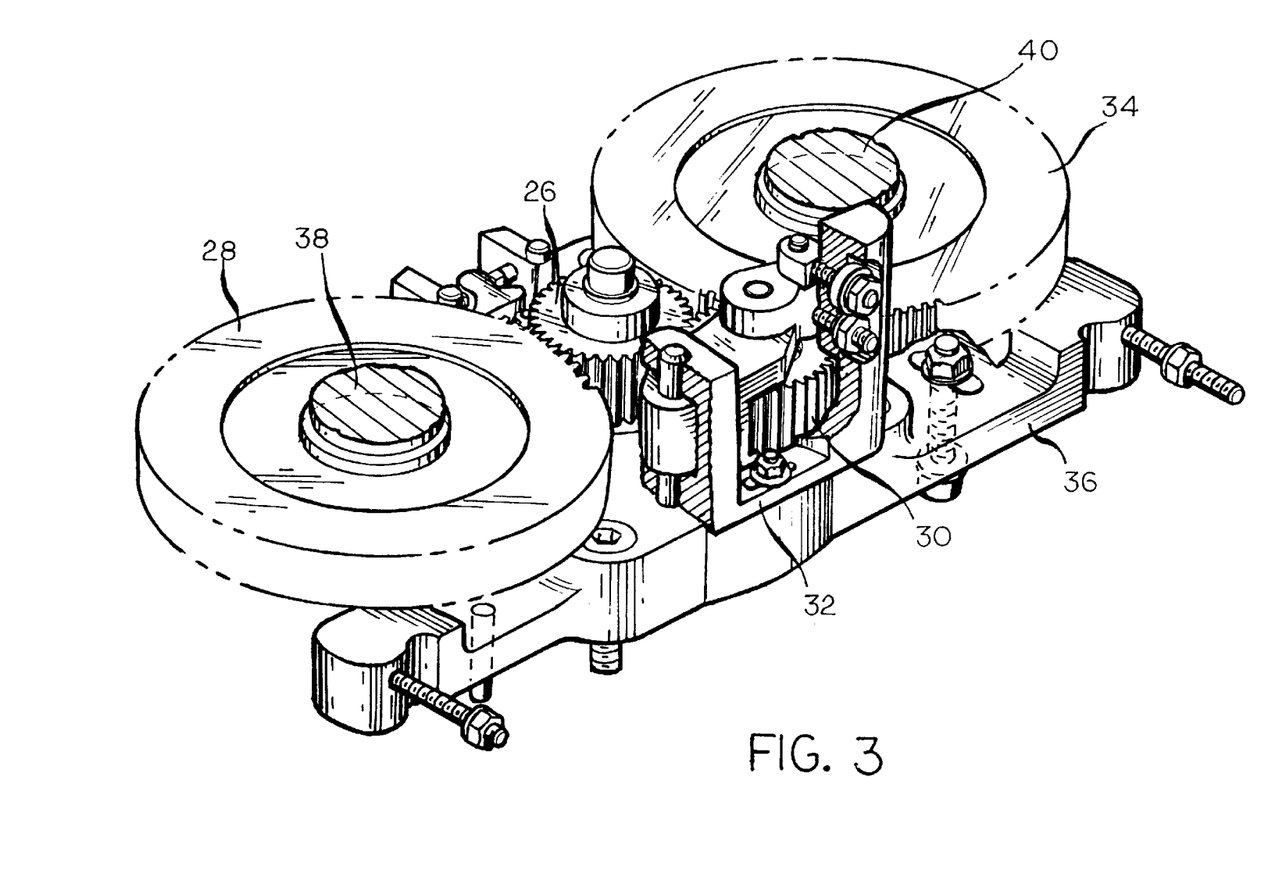
FIG. 3 is a fragmentary perspective view, partly in cross-section, illustrating a portion of the apparatus of FIGS. 1 and 2.

A blank molding side of a section of an I.S. machine is generally indicated by reference numeral 10 in FIG. 1, and the machine section 10 is made up of a pair of mold carrying arms 12, 14 that counteroscillate with respect to each other about a common axis A, which extends vertically in the normal orientation of an I.S. machine section 10. The mold carrying arm 12 carries one or more mold halves 16, shown as four such mold halves, each of which has a concave surface facing the mold carrying arm 14. Likewise, the mold carrying arm 14 carries a like number of mold halves 18, each of which has a concave surface facing the mold carrying arm 12. At the innermost positions of the mold carrying arms 12, 14, the mold halves 16 and the mold halves 18 are joined at their vertical edges so that the concave surfaces of the mold halves 16 and 18 form a plurality of closed cavities in which glass articles can be molded from moldable, high temperature glass, in the case of the arrangement of FIG. 1, a plurality of hollow parisons that can later be blown into containers. While FIG. 1 illustrates an arrangement for simultaneously producing four container parisons at each I.S. machine section, a machine arrangement that is often described as a "quad" machine, it is to be understood that the invention is also applicable to I.S. machines that are used to simultaneously produce three, two or even one container at each machine section. It is also to be understood that the apparatus that is used to counteroscillate the mold carrying arms 12, 14 is also applicable to counteroscillation of mold carrying arms (not shown) at a blow molding side of the I.S. machine section 10.

Figure 4:
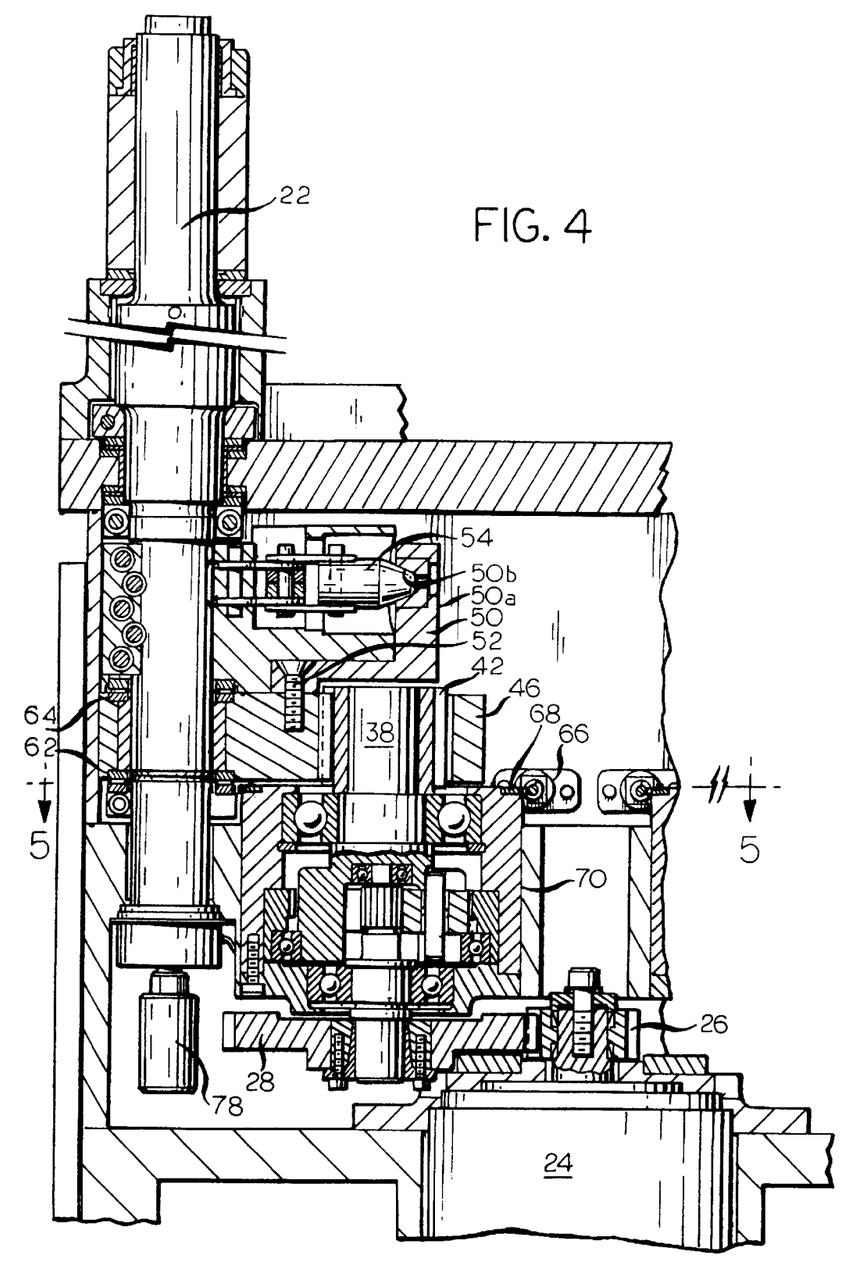
FIG. 4 is a fragmentary elevational view, partly in cross-section, illustrating a portion of the apparatus of FIGS. 1–3.
Figure 5:
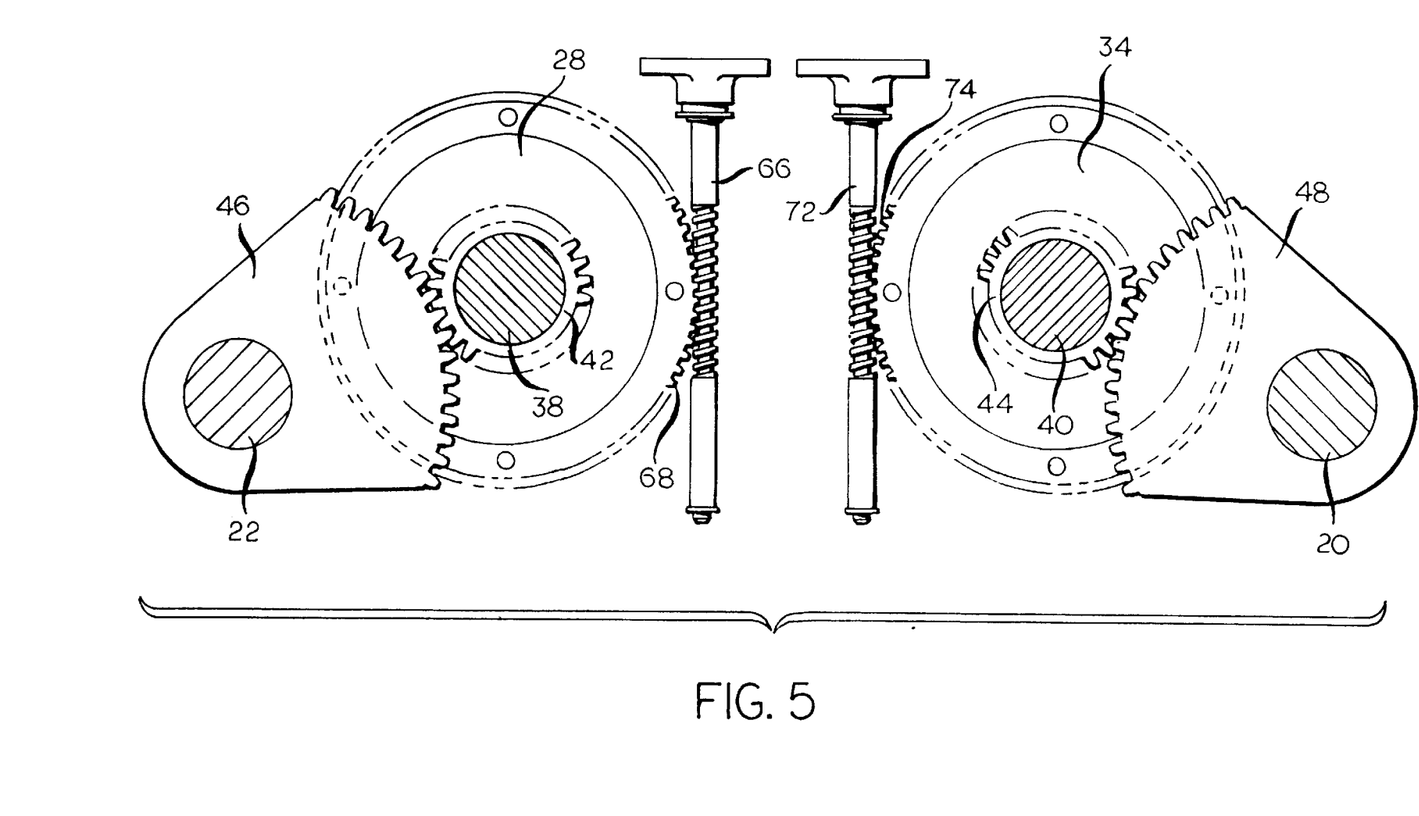
FIG. 5 is a cross-sectional view taken on line 5—5 of FIG. 4.

The mold carrying arm 12 is keyed or otherwise non-rotatably secured to an oscillating shaft 20 to be oscillatable therewith, and the mold carrying arm 14 is keyed or otherwise non-rotatably secured to a shaft 22 to be oscillatable therewith. Counteroscillating motion is simultaneously imparted to each of the shafts 20 and 22 from a single reversible electrical servo-motor 24 (FIG. 4) through a drive gear 26. The drive gear 26 directly drives a driven gear 28, and the drive gear 26 simultaneously directly drives an intermediate driven gear 30 that is rotatably mounted in an adjustable bracket 32 to be adjustable in position relative to the intermediate driven gear 30 and to a driven gear 34, which is driven by the intermediate driven gear 30. Adjustment of the adjustable bracket 32 serves to minimize backlash between the drive gear 26 and the intermediate driven gear 30 and between the drive gear 26 and the driven gear 28. The adjustable bracket 32, in turn, is adjustably mounted to a bracket 36 that is adjustably mounted to the I.S. machine section 10, and adjustment of the bracket 36 permits the positions of the servo motor 24, the driven gear 28, the intermediate driven gear 30 and the driven gear 34 to be adjusted, in unison, relative to the I.S. machine section 10.

The driven gear 28 is keyed or otherwise secured to a stub shaft 38, and the driven gear 34 is keyed or otherwise secured to a stub shaft 40. The stub shaft 38 also has an intermediate driven gear 42 keyed or otherwise secured thereto, and the stub shaft 40 also has an intermediate driven gear 44 keyed or otherwise secured thereto. The intermediate driven gear 42 is smaller in diameter than the driven gear 28 and is positioned at a higher elevation on the stub shaft 38 than the driven gear 28. Likewise, the intermediate driven gear 44 is smaller than the driven gear 34 and is positioned at a higher elevation on the stub shaft 40 than the driven gear 34. The gear 42 drivingly engages a sector gear 46 that is keyed or otherwise secured to the shaft 22, and the intermediate driven gear 44 drivingly engages a sector gear 48 that is keyed or otherwise secured to the shaft 20. Thus, motion of the servo motor 24 simultaneously imparts motion to the shaft 22, through the drive gear 26, the driven gear 28, the intermediate driven gear 42 and the sector gear 46 and, likewise, the motion of the servo motor 24 simultaneously imparts motion to the shaft 20 through the drive gear 26, the intermediate driven gear 30, the driven gear 34, the driven gear 44 and the sector gear 48.

Figure 6:
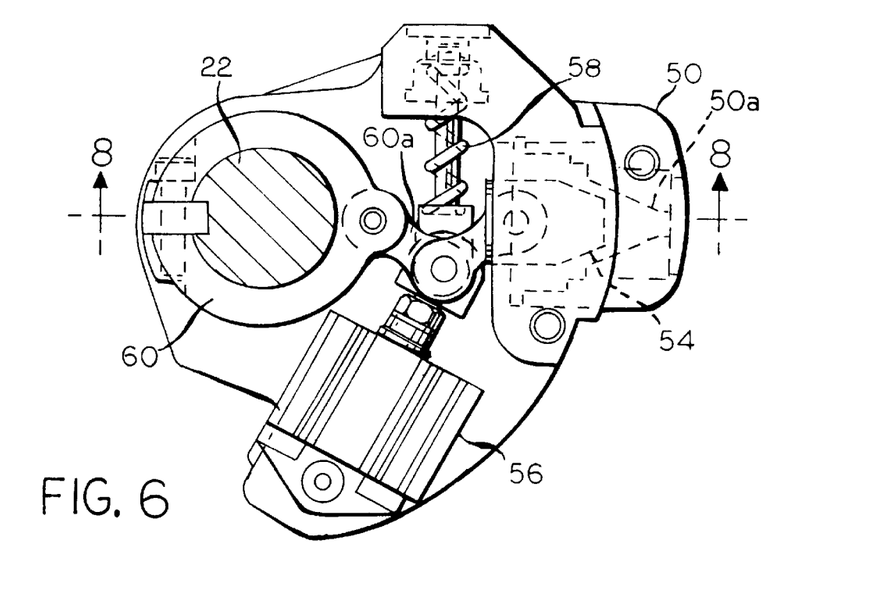
FIG. 6 is a plan view illustrating a portion of the apparatus of FIGS. 1–5.
Figure 7:
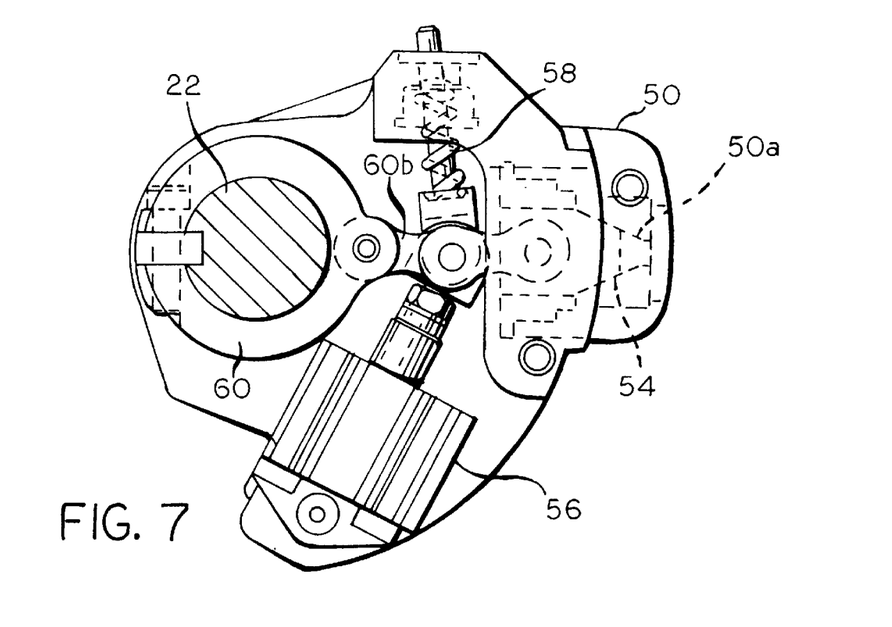
FIG. 7 is a view like FIG. 6 illustrating the apparatus thereof at a different position in its operating cycle.
Figure 8:
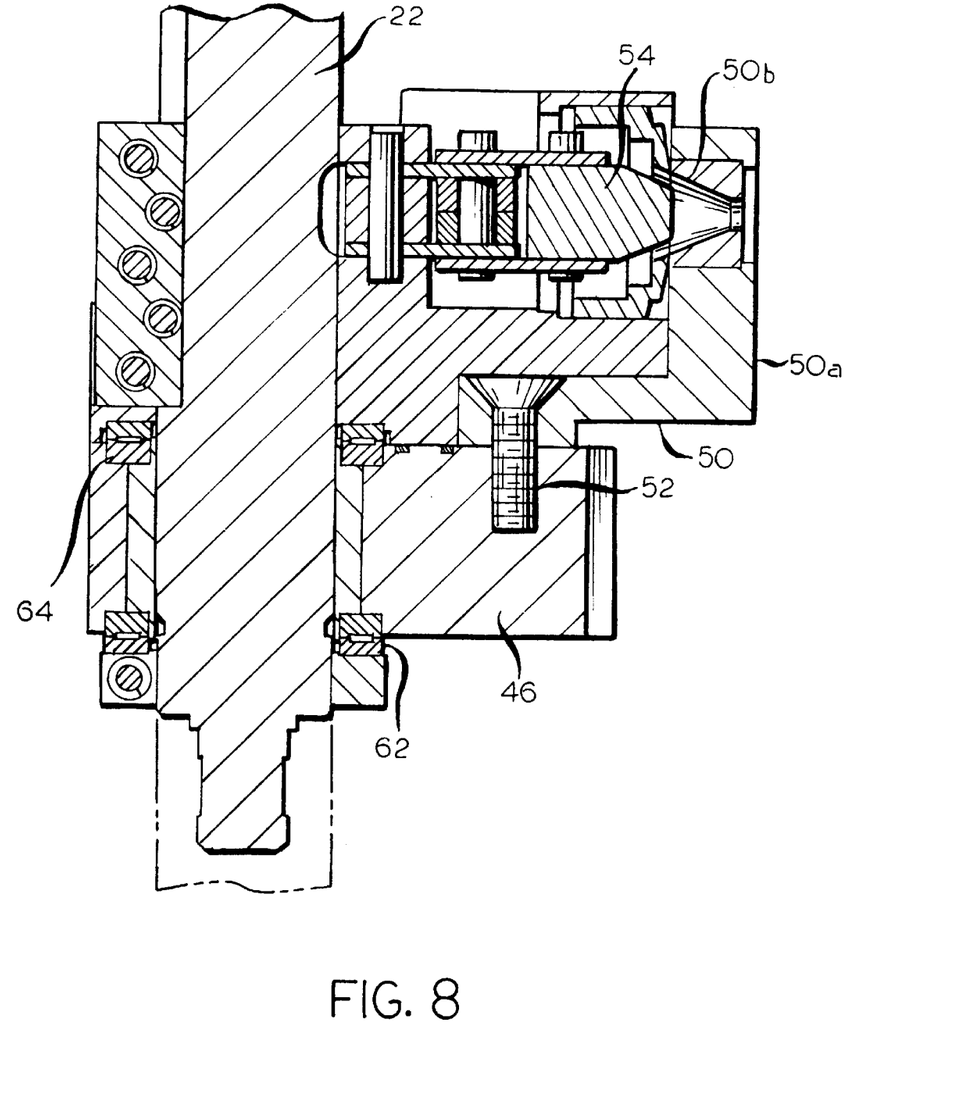
FIG. 8 is a cross-sectional view taken on line 8—8 of FIG. 6.

As is shown in FIGS. 4 and 6–8, the sector gear 46 is provided with a sector gear extension 50 that is attached to the sector gear 46 by a threaded fastener 52. An upstanding flange 50a of the sector gear extension 50 has a frustoconical recess 50b therein, and the recess 50b removably receives a free end of a pin 54. The pin 54 is movable between a position where its free end is received in the recess 50b, FIGS. 4 and 7, and a position where its free end is not received in the recess 50b, FIGS. 6 and 8. No turning motion will be imparted to the shaft 22 when the pin 54 is in the position of FIGS. 6 and 8, but will be imparted to the shaft 22 when the pin is in the position of FIGS. 4 and 7. Movement of the pin 54 between its position of FIGS. 4 and 7 and its position of FIGS. 6 and 8 is actuated by a pneumatic cylinder 56 that bears against an extension 60a of a collar 60 that non-rotatingly surrounds the shaft 22, the action of the cylinder 56 being opposed by a spring 58 that bears against an opposed side of the extension 60a of the collar 60. In the position of the pin 54 that is shown in FIGS. 6 and 8, any rotary motion imparted to the sector gear 46 by the servo motor 24 will not be imparted to the shaft 22, spaced apart bearings 62, 64 being provided to permit the sector gear 46 to turn on the shaft 22 during such times. While not specifically shown, the sector gear 48 is disengagably secured to the shaft 20 in the same manner that the sector gear 46 is disengagably secured to the shaft 22, as heretofore explained.

To accurately position the mold halves 16, 18 in the closed and open positions thereof, each shaft 20, 22 is circumferentially adjustable relative to the servo motor 24. In that regard, a manually adjustable worm 66 is provided in engagement with an annular set of teeth 68 carried by a gearbox 70 that is provided to transmit torque from a driven gear to the stub shaft 38. Likewise, a manually adjustable worm 72 is provided in engagement with an annular set of teeth 74 carried by a gearbox 76 that is provided to transmit torque from the driven gear 34 to the stub shaft 40.

For optimum actuation of the opening and closing of the mold carrying arms 12, 14, the servo motor 24 is of a dual winding character, with a first winding to provide higher speed/lower torque movement to the mold carrying arms 12, 14 during an initial portion of their closing movements and during their opening movements, and a second winding to provide lower speed/higher torque movement to the mold carrying arms 12, 14 during a final portion of their closing movements, to thereby minimize impact loads upon closing and to provide for high clamping loads on the mold carrying arms 12, 14, when closed, when the molding of parisons in the mold cavities defined by the mold halves 16, 18 would otherwise tend to separate the mold carrying arms 12, 14. In that regard, the actual circumferential position of the shaft 22 is sensed by a resolver 78, and the actual position of the shaft 20 is sensed by a resolver 80. Signals from the resolvers 78, 80 are used in a motor control circuit to control the operation of the servo motor 24 between its first winding and its second winding. Motors corresponding to the motor 24 are available from Motor Products International, Inc., 1600 N. Horizon Blvd., El Paso, Tex.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. A glassware forming machine comprising:
    first and second mold carrying arms pivoted about an axis for counteroscillating motion toward and away from one another to bring a mold half carried by each mold carrying arm into closed and open positions with respect to a mold half carried by the other mold carrying arm;
    a single, reversible electric motor; and
    gear means comprising:
        drive gear driven by said electric motor;
        first driven gear means directly driven by said drive gear for imparting oscillating motion to one of said first and second mold carrying arms;
        an intermediate driven gear directly driven by said drive gear; and
        second driven gear means directly driven by said intermediate driven gear means for imparting oscillating motion to the other of said first and second mold carrying arms, the oscillating motion imparted by said second driven gear means being counter to the oscillating motion imparted by said first driven gear means.

2. A glassware forming machine according to claim 1 and further comprising:
    first adjustable mounting means for adjustably mounting said intermediate driven gear relative to said drive gear and said other of said first driven gear means and said second driven gear means to minimize backlash between said drive gear and said intermediate driven gear and said other of said first driven gear means and said second driven gear means.

3. A glassware forming machine according to claim 2 and further comprising:
    second means for adjustably mounting, said second means for adjustably mounting serving to adjust a position of said drive gear relative to said one of said first driven gear means and said second driven gear means to minimize backlash between said drive gear and said one of said first driven gear means and said second driven gear means.

4. A glassware forming machine according to claim 3 wherein said first mold carrying arm comprises a first shaft with a first sector gear disengagably secured to said first shaft, and wherein said second mold carrying arm comprises a second shaft with a second sector gear disengagably secured to said second shaft, and wherein:
    said first driven gear means comprises a first driven gear and a first sector gear drive gear coaxially aligned with said first driven gear and spaced from said first driven gear, said first shaft having an axis that is spaced from an axis of said first sector gear drive gear, said first sector gear drive gear drivingly engaging said first sector gear; and
    wherein said second driven gear means comprises a second driven gear and a second sector gear drive gear coaxially aligned with said second driven gear and spaced from said second driven gear, said second shaft having an axis that is spaced from an axis of said second driven gear, said second sector gear drive gear drivingly engaging said second sector gear.

5. A glassware forming machine according to claim 4 and further comprising:
    first drive means extending between said first driven gear and said first sector gear drive gear for causing said first sector gear drive gear to rotate with said first driven gear; and
    second drive means extending between said second driven gear and said second sector gear drive gear for causing said second sector gear drive gear to rotate with said second driven gear.

6. A glassware forming machine according to claim 5 and further comprising:
    first releasably securing means for releasably securing said first sector gear to said first shaft; and
    second releasably securing means for releasably securing said second sector gear to said second shaft.

7. A glassware forming machine according to claim 6 wherein:
    said first releasably securing means comprises a first sector gear extension secured to said first sector gear, said first sector gear extension having an opening with an axis extending normally of an axis of said first shaft, first retractable pin means carried by said first shaft for selectively engaging the opening of said first sector gear extension, and first pin actuating means for selectively causing said first retractable pin means to engage the opening of said first sector gear extension; and wherein:
    said second releasable securing means comprises a second sector gear extension secured to said second sector gear, said second sector gear extension having an opening with an axis extending normally of an axis of said second shaft, second retractable pin means carried by said second shaft for selectively engaging the opening of said second sector gear extension, and second pin actuating means for selectively causing said second retractable pin means to engage the opening of said second sector gear extension.

8. A glassware forming machine according to claim 6 and further comprising:
    first circumferential position adjusting means for adjusting a circumferential position of said first shaft relative to a circumferential position of said first driven gear; and
    second circumferential position adjusting means for adjusting a circumferential position of said second shaft relative to a circumferential position of said second driven gear means.

9. A glassware forming machine according to claim 8 wherein:
    said first circumferential position adjusting means comprises a first manually adjustable worm and a first position adjusting gear in engagement with said first manually adjustable worm, said first position adjusting gear being coaxially aligned with said first driven gear means; and wherein
    said second circumferential positioning means comprises a second manually adjustable worm and a second position adjusting gear in engagement with said second manually adjustable worm, said second position adjusting gear being coaxially aligned with said second driven gear means.

10. A glassware forming machine according to claim 1 wherein:

said reversible electric motor comprises a servo motor with dual winding means, said dual winding means comprising a first, higher speed/lower torque winding for causing motion of said first and second mold carrying arms during first portions of motions toward one another and during motions away from one another, and a second, lower speed/higher torque winding for causing motion of said first and second mold carrying arms during second portions of motions toward one another.

* * * * *